United States Patent Office 3,312,070
Patented Apr. 4, 1967

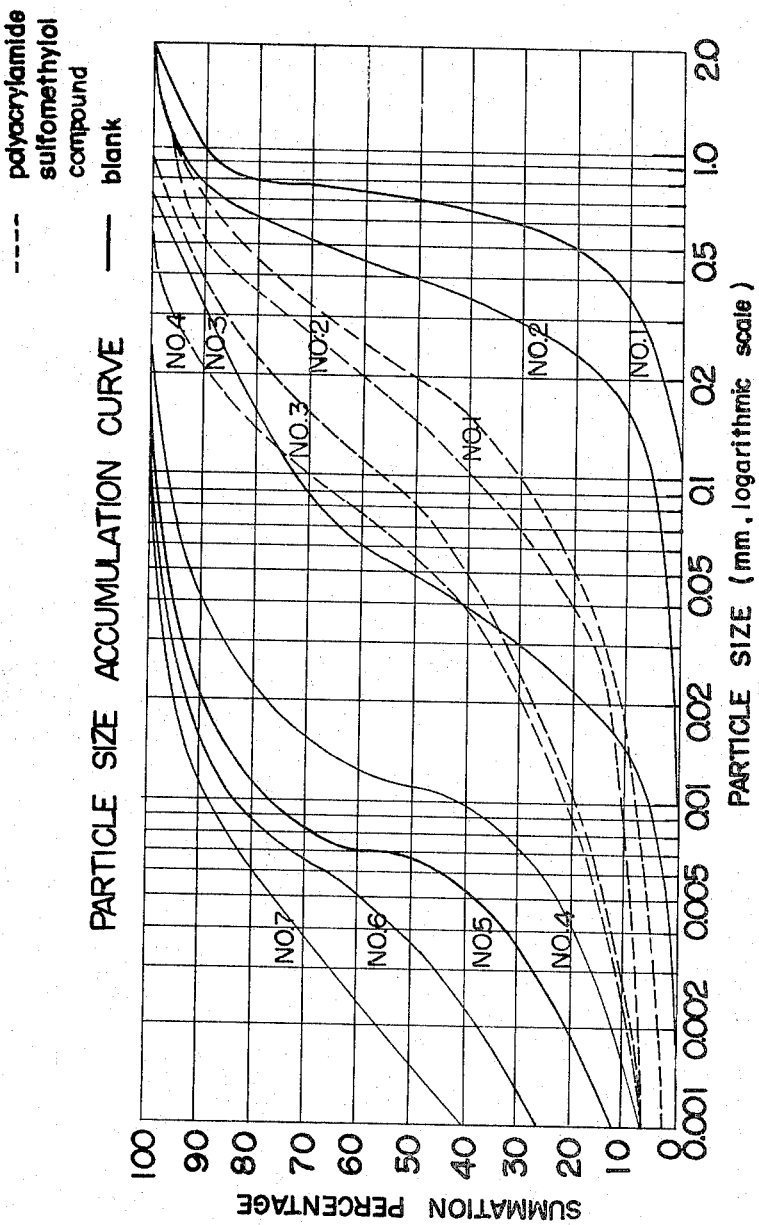

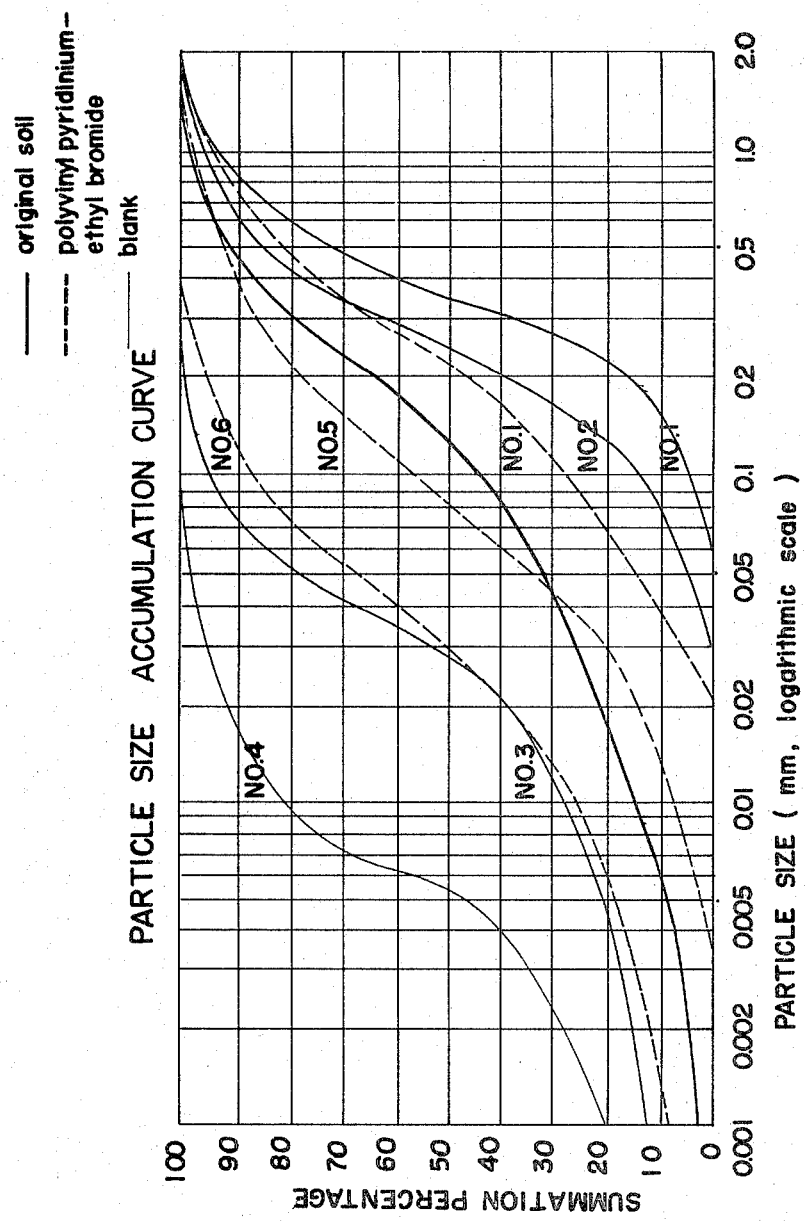

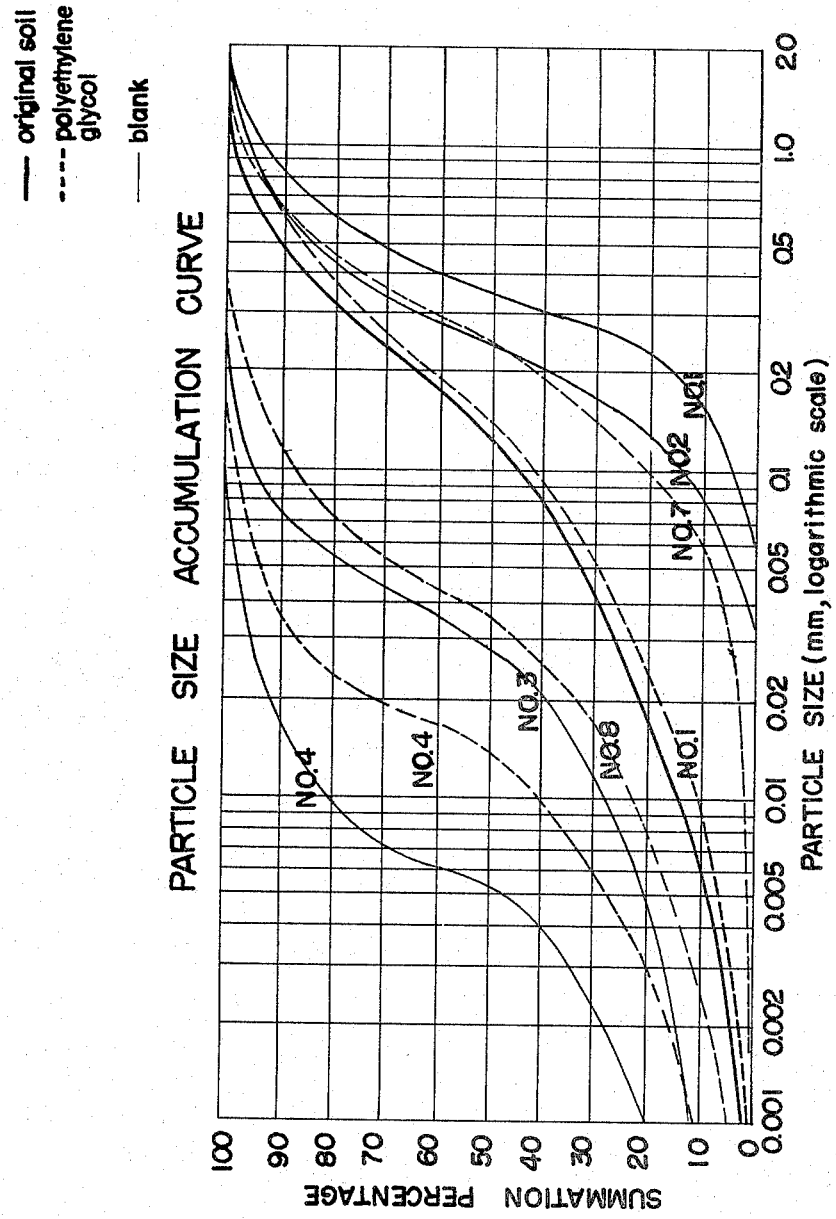

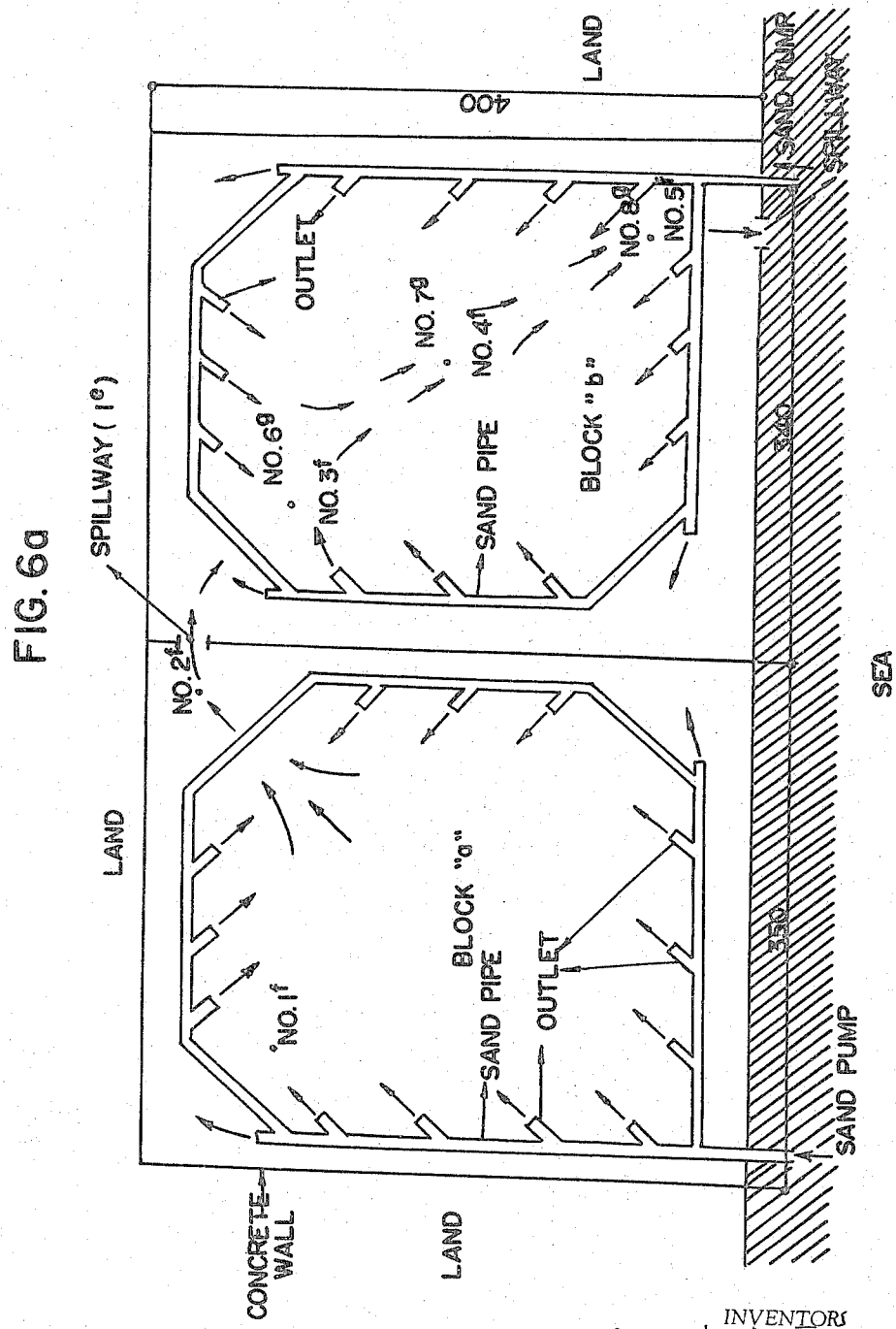

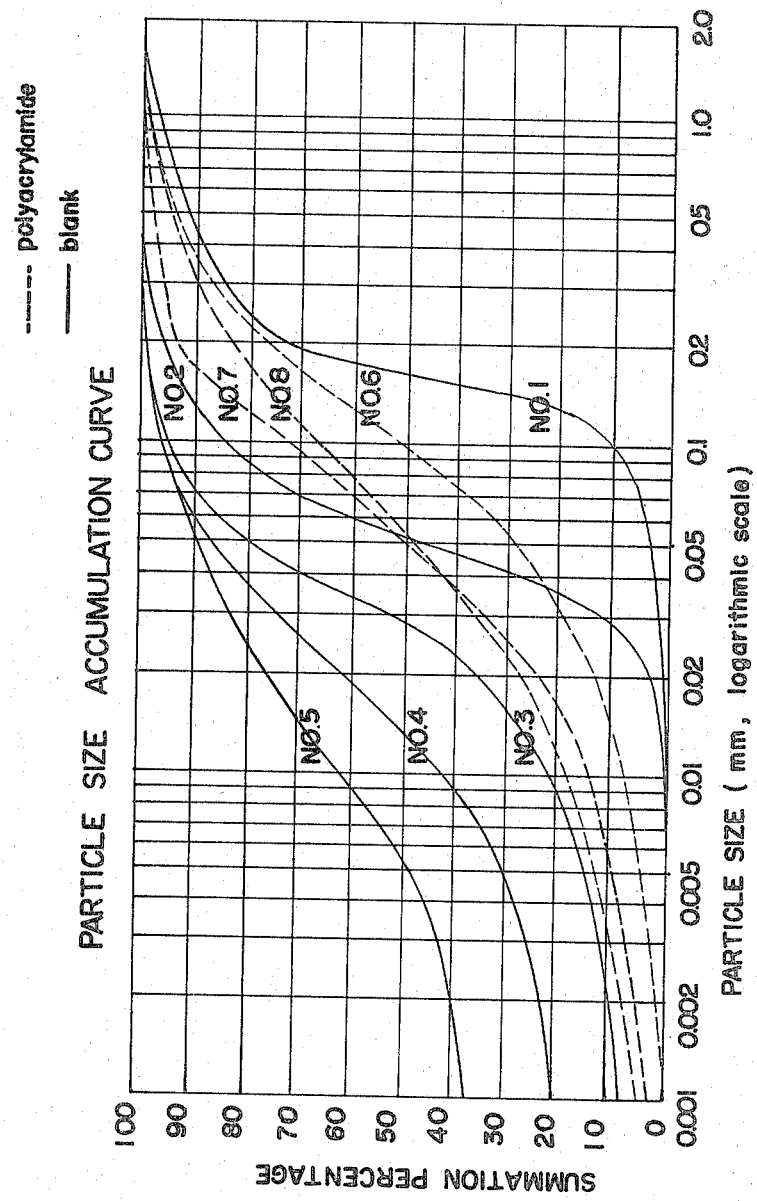

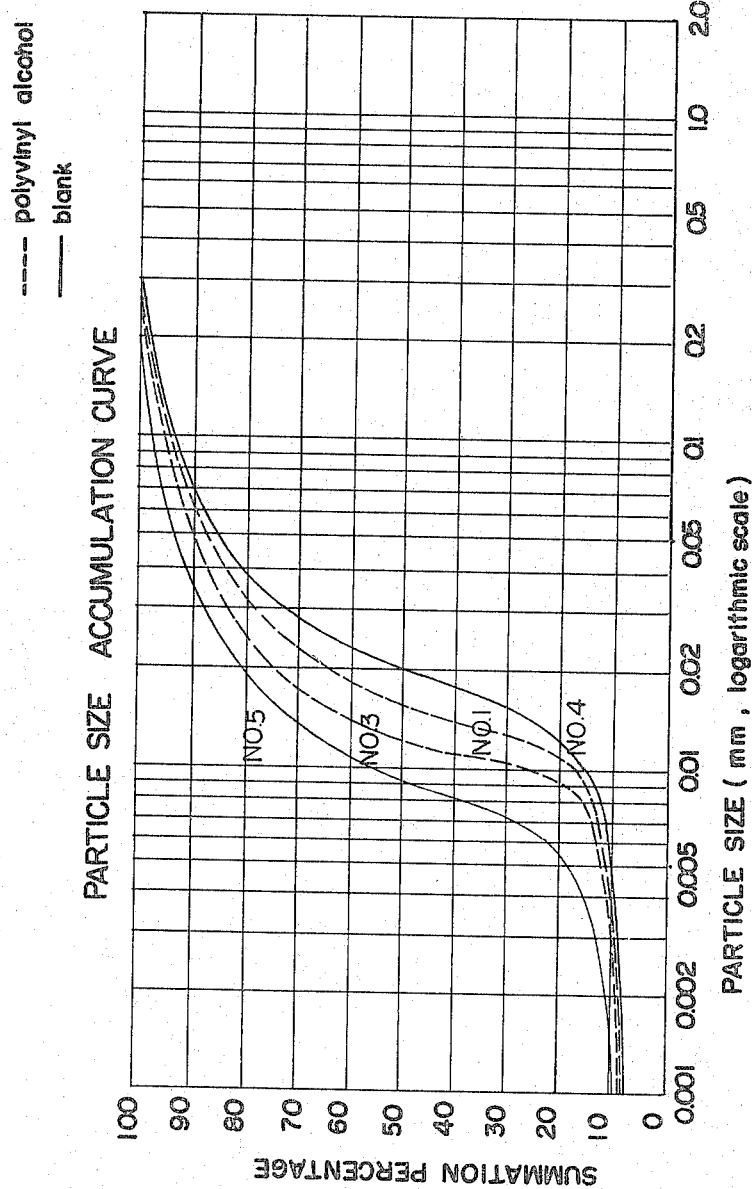

3,312,070
METHOD OF MAKING RECLAIMED GROUND WITH COAGULATIVE SURFACE ACTIVE AGENTS
Shinichiro Matsuo, Tenri, Nara Prefecture, and Hikaru Konishi, Kyoto, Japan; said Konishi assignor to Dai-Ichi Kogyo Seiyaku Kabushiki Kaisha, Kyoto, Japan, a corporation of Japan
Filed Oct. 11, 1965, Ser. No. 500,475
Claims priority, application Japan, Mar. 9, 1960, 35/1,271
13 Claims. (Cl. 61—36)

This is a continuation-in-part application of copending application Ser. No. 258,958, filed Feb. 13, 1963, now abandoned, which in turn is a continuation-in-part application of patent application Ser. No. 92,364, filed Feb. 28, 1961, now abandoned.

The present invention relates to a method of forming reclaimed ground using coagulative surface active agents, wherein the coagulative surface active agents are admixed with water of a sand pump containing various earth particles of assorted sizes, such as silt, clay, sand and other coarse grains, and the particles deposited to form a uniform fill.

It is an object of the present invention to provide an efficient method for producing reclaimed ground having superior properties.

In the conventional method for making reclaimed ground, earth is dredged from the sea-bottom or a river-bed and delivered, usually by a sand pump, to the reclaiming area with sea or river water. When the dredged earth includes a large amount of fine soft earth such as silt or clay, the sand and other comparatively coarse grains will be deposited near the outlet of the sand pump, and the finer silt or clay will be deposited the farther from the outlet. Thus, the production of reclaimed fill having substantially uniform properties is not accomplished.

The present invention provides a method for forming reclaimed ground using coagulative surface active agents, which are admixed with the earth particles containing the delivery water, resulting in the deposition of a uniform earth fill.

As noted, earth particles used to provide fill are made up of a variety of types and sizes. These are generally characterized as clay which is finer than 5 microns; silt which is between about 5 microns and 50 microns; and sand which is considered to have a grain diameter size of between 50 microns and 2 millimeters. Other constituents of the solid fill material may be larger particles such as cobble, pebbles, gravel, etc., or exceedingly fine particles in the colloidal size range. As shown in the example hereinafter, when water carrying a mixture of such earth particles is exited from an outlet, the larger particles tend to deposit in the areas closest to the outlet, and the very fines tend to deposit in the areas farthest from the outlet. In many land-fill operations, a considerable proportion of the fines do not deposit within the desired area and is wasted with the overflow water. The ground reclaimed under such conditions is non-uniform and has various disadvantages when considered as a base for roadways, buildings, etc. Attempts have been made to provide greater uniformity by frequent changes in position of the outlet of the pipe through which the earth fill is delivered. This increases cost and has not been technically advantageous.

In accordance with the present invention, a small effective amount of a coagulative surface active agent is introduced into the pipe containing the water and earth particles at a predetermined position within about 200 meters from the discharge outlet so that, after discharge from the pipe, the earth particles settle rapidly to form a reclaimed ground deposit having superior properties including a substantially uniform load bearing capacity. Whereas the deposits formed when not using the coagulative agent appear to be primarily deposits of coarse grained material such as sand, gravel, etc., at one location and deposits of fine particles such as clay, silt, and the like, at another location, the deposits formed when using the coagulative surface active agent are a relatively uniform aggregated structure formed from a deposited admixture of both coarse and fine particles.

The coagulative surface active agents are inserted into the delivery pipe at a position which is within 200 meters, and preferably between about 20 and 50 meters, from the outlet. When the agent is introduced very close to the outlet, there may not be sufficient time for it to be uniformly mixed with the earth particles being carried by the water. This could result in some non-uniform deposition and inefficient utilization of the agent. Where the agent is introduced into the pipe at too great a distance from the outlet, the "flocs" formed by coagulation of particles may be broken up before discharge at the outlet. The amount of agent used, as well as the optimum position of introduction thereof, will vary with the diameter of the pipe, the velocity and the amount of material flowing through the pipe, the percent solids being carried by the water, and the type and distribution of particles constituting the solids. From the foregoing it is obvious that good results may be obtained by introducing the coagulative agent closer to the outlet if an agitating device, e.g. a sand pump, is in the line at this point, or between the point of introduction and the outlet.

The coagulative surface active agents used in the present invention are any of the anionic, cationic non-ionic, amphoteric, and high-molecular weight surface active agents which satisfy the condition that when an effective amount of the agent is mixed with the water containing earth particles (normally about 10% of mud suspended in sea water or river water) the sedimentation velocity will be more than four times greater than would be the sedimentation velocity in the absence of the coagulative agent.

The sedimentation velocity referred to in the specification and claims when characterizing the useful coagulative surface active agents as those which increase the sedimentation velocity by a factor of four or greater refers to the velocity as determined in a test utilizing a sample of the fill particles and the water from the reclamation site, as follows: ten grams (dry weight) of a sample of the fill material to be used in the reclamation is measured into a hundred cubic centimeters measuring cylinder. The cylinder is then filled to the hundred cubic centimeter mark with water. The water utilized is sampled from the water to be used at the reclamation site. The use of samples of the fill particles and of the water from the reclamation site is dictated by the effect on sedimentation velocity of the composition and size of the particles and the concentration of salt in the water. The measuring cylinder is then agitated so that the particles are completely dispersed. The measuring cylinder is then inverted and the time required for the particles to settle to a predetermined volume is determined. The comparative data when using the coagulative surface active agent is obtained by following the foregoing instruction. Namely, ten grams (dry weight) of a sample of the fill material is measured into a hundred cubic centimeters measuring cylinder and then an optional amount (normally less than 10 cubic centimeters) of 0.33% coagulative surface active agent solution preliminary prepared is supplied into said measuring cylinder by the use of a pipette. After that, the cylinder is filled to the hundred cubic centimeter mark with the water.

The measuring cylinder is then agitated and after that the sedimentation velocity is measured.

Accordingly, the above experiment is then achieved for several times with the use of a varied amount of the coagulative surface active agent and that the sedimentation velocity of the coagulative surface active agent is figured out, at the same time, an actual amount to be applied for reclaiming ground is determined. (1 cc. of the 0.33% coagulative surface active agent corresponds to ⅓ kg. of the coagulative surface active agent per 1 ton (dry weight) of fill materials by weight.) In addition to determining the comparative sedimentation rate, this test permits observation of the structure of the sediment deposit formed. The deposit formed without the coagulative surface active agent present will be stratified; as compared to the aggregated structure formed when using the coagulative agent. It is to be noted that throughout the specification when the amount of coagulative agent is referred to in parts per million (p.p.m.) or percent, reference is to the weight of the solid fill material.

The following agents are illustrative of the useful coagulative surface active agents: polyacrylamide; the reaction product of polyacrylamidesulfomethylol; the polymeric reaction product of carboxymethylcellulose and acrylamide; the water soluble condensed resin formed by condensation of aniline, urea and formaldehyde; polyvinylpyridinium ethylbromide; polyvinylpyrollidone; polyethyleneimine; polyvinyl-alcohol; polyvinylacetate; polyethyleneglycol; methylcellulose; hydroxyethylcellulose; copolymers of vinyl acetate and styrene with maleic acid. Certain of the foregoing agents hydrolize in water to form partially hydrolized derivatives, e.g. polyacrylamide, polyvinyl acetate, etc. It is to be understood that the agent specified in this specification and claims includes its equivalent hydrolyzed (commonly only partially hydrolyzed) form.

With these and other objects in view, which will become apparent in the following detailed description, the present invention will be more clearly understood in connection with the accompanying drawings, in which:

FIGS. 2a, 3a, 6a, 7a and 8a are different embodiments of reclaiming ground by admixing different agents; and FIGS. 2b, 3b, 4b, 5b, 6b, 7b, and 8b are depicting by corresponding diagrams the improved reclaiming of the ground in a relation of the grain size to the percentage by weight.

Figure 1:
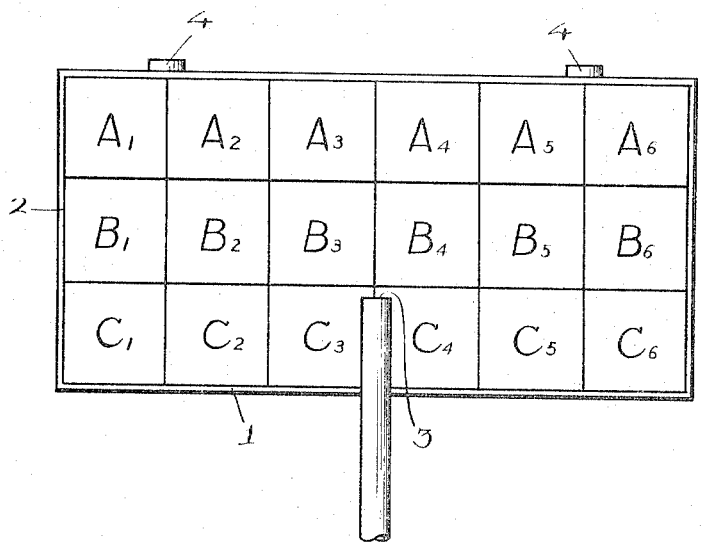
FIGURE 1 is a schematic view of an embodiment of an apparatus for performing the method designed in accordance with the present invention.

Refering now to the drawings, and in particular to FIG. 1, seashore ground to be reclaimed is enclosed with reinforced concrete walls 1 and 2 of 120 meters length and 60 meters width, the outlet 3 of a sand pump being disposed at a position somewhat set off (with respect to the direction of the discharge) the center of the enclosed area. Drain water, containing mud, sand, etc., is delivered at the rate of 350 m.³/h., the water contains a polymer consisting of carboxymethylcellulose polymerized with acrylamide (weight ratio of acrylamide: carboxymethylcellulose being 2.5:1.0, as an example for a coagulative agent). 0.0005% of this agent makes the sedimentation velocity as much as four times that of conventional drain water not containing such an agent. The ground is reclaimed up to 2 meters above the sea levels. Then the area within the walls 1 and 2 is equally divided into eighteen sections $A_1$ to $A_6$, $B_1$ to $B_6$ and $C_1$ to $C_6$, from each of which sections samples have been taken.

At another place, after a reclaimed ground has been formed, according to the conventional method, under the same conditions as above, samples have been taken to compare the grain sizes (diameters) made by both methods.

In the drawing, 4 denotes the outlets for discharge of the overflow water.

In the following comparative tables, Table 1 shows the data taken immediately after the reclaiming work has been finished. Table 2 after two months and Table 3 after six months, respectively.

Thus Table 1 shows the compared data about the grain size distribution of material of which the foundation is formed by the present invention and by the conventional method, respectively. This table indicates quite clearly that the reclaimed ground prepared in accordance with the present invention is very uniform. Tables 2 and 3 illustrate that the bearing power of the different sections of the reclaimed ground is very uniform and that these values are comparatively large.

TABLE 1.—GRAIN SIZE DISTRIBUTION IN PERCENT

| With or without interface activator | Grain, dia. | | | | | |
|---|---|---|---|---|---|---|
| | Less than 0.001 mm. | 0.005 to 0.001 mm. | 0.05 to 0.005 mm. | 0.25 to 0.05 mm. | 2.0 to 0.25 mm. | More than 2 mm. |
| Without, $A_1$ (conventional method) | 14 | 7 | 25 | 28 | 26 | 0 |
| With, $A_1$ (present invention method) | 5 | 5 | 10 | 57 | 23 | 0 |
| Without, $A_2$ | 10 | 7 | 13 | 40 | 30 | 0 |
| With, $A_2$ | 4 | 5 | 9 | 60 | 22 | 0 |
| Without, $A_3$ | 9 | 4 | 13 | 49 | 25 | 0 |
| With, $A_3$ | 5 | 6 | 10 | 58 | 21 | 0 |
| Without, $A_4$ | 10 | 5 | 10 | 49 | 26 | 0 |
| With, $A_4$ | 5 | 4 | 10 | 59 | 22 | 0 |
| Without, $A_5$ | 9 | 7 | 13 | 43 | 28 | 0 |
| With, $A_5$ | 5 | 3 | 13 | 57 | 22 | 0 |
| Without, $A_6$ | 12 | 7 | 20 | 37 | 24 | 0 |
| With, $A_6$ | 6 | 4 | 8 | 61 | 21 | 0 |
| Without, $B_1$ | 11 | 7 | 19 | 40 | 23 | 0 |
| With, $B_1$ | 5 | 5 | 9 | 57 | 24 | 0 |
| Without, $B_2$ | 11 | 3 | 11 | 48 | 27 | 0 |
| With, $B_2$ | 5 | 4 | 9 | 59 | 23 | 0 |
| Without, $B_3$ | 5 | 4 | 10 | 53 | 28 | 0 |
| With, $B_3$ | 3 | 5 | 6 | 64 | 22 | 0 |
| Without, $B_4$ | 4 | 4 | 9 | 58 | 25 | 0 |
| With, $B_4$ | 3 | 4 | 11 | 61 | 21 | 0 |
| Without, $B_5$ | 8 | 4 | 12 | 50 | 26 | 0 |
| With, $B_5$ | 5 | 4 | 11 | 59 | 21 | 0 |
| Without, $B_6$ | 12 | 6 | 21 | 38 | 23 | 0 |
| With, $B_6$ | 5 | 6 | 10 | 60 | 19 | 0 |
| Without, $C_1$ | 13 | 7 | 25 | 28 | 27 | 0 |
| With, $C_1$ | 9 | 4 | 15 | 57 | 15 | 0 |
| Without, $C_2$ | 9 | 7 | 12 | 40 | 32 | 0 |
| With, $C_2$ | 6 | 7 | 4 | 63 | 20 | 0 |
| Without, $C_3$ | 1 | 3 | 7 | 54 | 35 | 0 |
| With, $C_3$ | 3 | 6 | 6 | 53 | 32 | 0 |
| Without, $C_4$ | 5 | 5 | 9 | 52 | 29 | 0 |
| With, $C_4$ | 6 | 6 | 5 | 64 | 19 | 0 |
| Without, $C_5$ | 7 | 5 | 3 | 55 | 30 | 0 |
| With, $C_5$ | 6 | 5 | 2 | 59 | 28 | 0 |
| Without, $C_6$ | 12 | 6 | 22 | 34 | 26 | 0 |
| With, $C_6$ | 8 | 4 | 10 | 50 | 28 | 0 |

TABLE 2.—BEARING CAPACITY AFTER 2 MONTHS IN TONS PER M.³

| With or without coagulative surface active agent | Section No. | Bearing capacity | Section No. | Bearing capacity | Section No. | Bearing capacity |
|---|---|---|---|---|---|---|
| With | $A_1$ | 22.1 | $A_2$ | 22.3 | $A_3$ | 21.8 |
| Without | $A_1$ | 3.2 | $A_2$ | 7.1 | $A_3$ | 9.4 |
| With | $A_4$ | 22.0 | $A_5$ | 22.4 | $A_6$ | 22.0 |
| Without | $A_4$ | 9.6 | $A_5$ | 8.2 | $A_6$ | 4.9 |
| With | $B_1$ | 22.1 | $B_2$ | 22.4 | $B_3$ | 22.4 |
| Without | $B_1$ | 4.2 | $B_2$ | 10.0 | $B_3$ | 22.3 |
| With | $B_4$ | 22.6 | $B_5$ | 21.9 | $B_6$ | 22.2 |
| Without | $B_4$ | 23.4 | $B_5$ | 17.0 | $B_6$ | 6.2 |
| With | $C_1$ | 21.7 | $C_2$ | 22.2 | $C_3$ | 22.5 |
| Without | $C_1$ | 2.7 | $C_2$ | 7.4 | $C_3$ | 22.0 |
| With | $C_4$ | 22.4 | $C_5$ | 22.3 | $C_6$ | 22.1 |
| Without | $C_4$ | 22.5 | $C_5$ | 9.8 | $C_6$ | 3.7 |

TABLE 3.—BEARING CAPACITY AFTER 6 MONTHS IN TONS PER M.³

| With or without coagulative active agent | Section No. | Bearing capacity | Section No. | Bearing capacity | Section No. | Bearing capacity |
|---|---|---|---|---|---|---|
| With | $A_1$ | 22.2 | $A_2$ | 22.3 | $A_3$ | 22.2 |
| Without | $A_1$ | 3.7 | $A_2$ | 7.2 | $A_3$ | 9.5 |
| With | $A_4$ | 22.0 | $A_5$ | 22.4 | $A_6$ | 22.3 |
| Without | $A_4$ | 9.8 | $A_5$ | 8.9 | $A_6$ | 5.1 |
| With | $B_1$ | 22.5 | $B_2$ | 22.4 | $B_3$ | 22.6 |
| Without | $B_1$ | 4.2 | $B_2$ | 11.1 | $B_3$ | 22.3 |
| With | $B_4$ | 22.7 | $B_5$ | 23.0 | $B_6$ | 22.3 |
| Without | $B_4$ | 23.5 | $B_5$ | 17.3 | $B_6$ | 7.5 |
| With | $C_1$ | 22.4 | $C_2$ | 23.7 | $C_3$ | 22.5 |
| Without | $C_1$ | 3.0 | $C_2$ | 7.7 | $C_3$ | 22.4 |
| With | $C_4$ | 22.7 | $C_5$ | 22.8 | $C_6$ | 23.1 |
| Without | $C_4$ | 23.2 | $C_5$ | 10.7 | $C_6$ | 3.9 |

Several examples are now given applied to different locations and using different coagulative surface active agents:

Example I

Figure 2A:
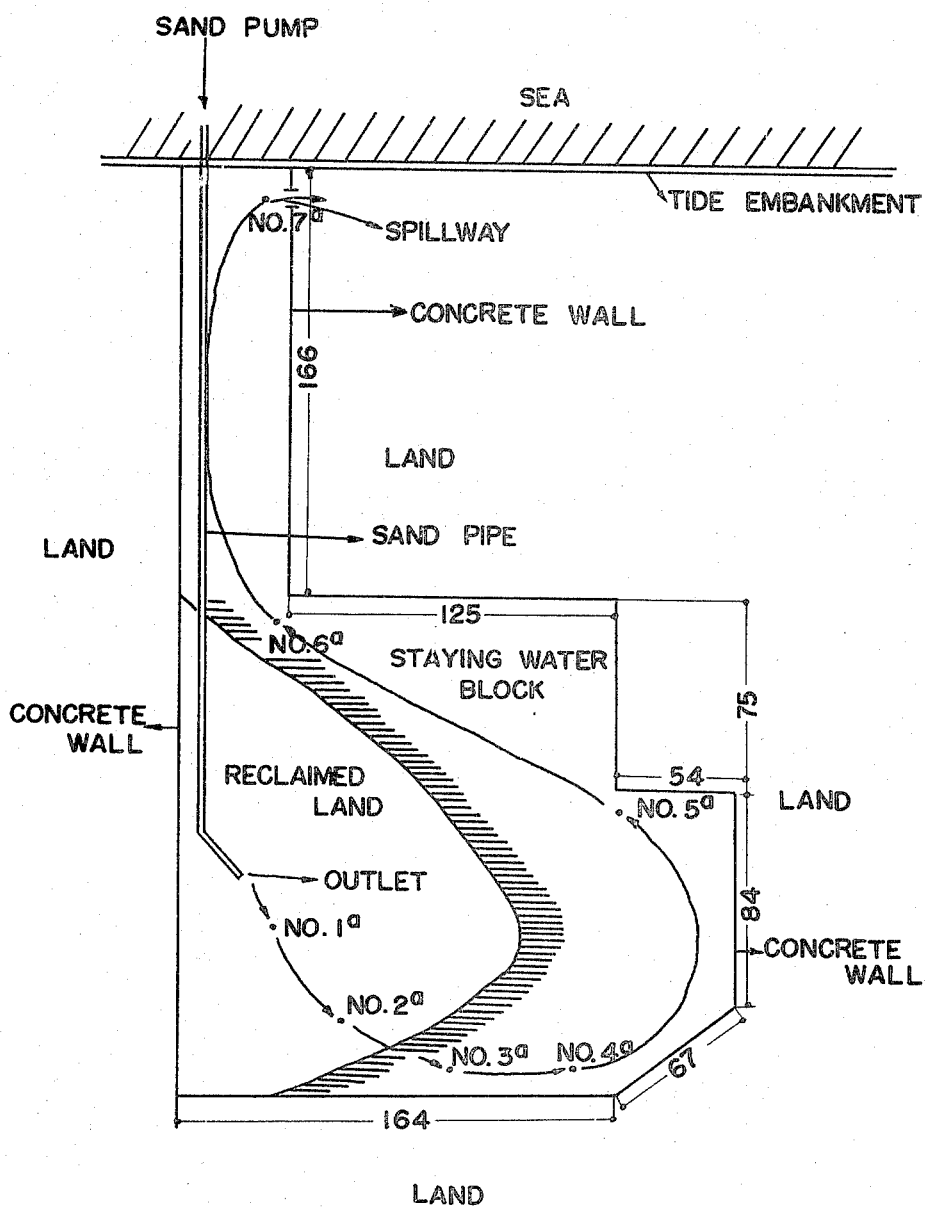

Topography of the reclaimed ground "A" is shown in FIG. 2a. A 1,500 H.P. sand pump was used for the reclamation. The arrows in FIG. 2a show the direction of the stream of the slurry from the sand pipe. Beyond the location No. 3ª the area is under water. An amount in 30 p.p.m. (parts in weight per million) of a polyacrylamide-sulfomethylol compound (the intrinsic viscosity in 1 normal sodium chloride aqueous solution was 9.5 at 30° C.) has been added to the slurry during its delivery into the sand pipe as a coagulative surface active agent.

In order to investigate the distribution of the soil, a grain size distribution analysis has been performed by collecting sand from the locations No. 1ª to No. 4ª, when the polyacrylamide-sulfomethylol compound was added, and from No. 1ª to No. 7ª, when it was not added. In the former case, the samples were taken only from the location No. 1ª to No. 4ª, since the sedimentation of sand and soil was perfectly completed within this region.

The result of the analysis of the grain size distribution shown in FIG. 2b indicates clearly that a uniform grain size distribution is obtained by adding the polyacrylamide-sulfomethylol compound into the soil.

It should be further noted that the coagulative surface active agent used in the present experiment was entirely decomposed by oxidation. This phenomenon has been also observed in other experiments.

Example II

For the reclamation of the ground B (FIG. 3a), the soil, taken from an inland ditch by a 350 H.P. sand pump, was used. An amount in 120 p.p.m. (parts in weight per million) of water soluble anilin-urea-formaldehyde-condensed-resin and an amount in 40 p.p.m. (parts in weight per million) of polyacrylamide (the intrinsic viscosity of 1 normal aqueous solution at 30° C. was 10.0) were added into the dredged soils.

In order to analyze the grain size distribution, the samples of the soil were collected from the locations Nos. 1ᵇ, 2ᵇ and 3ᵇ when the experiment was performed by adding the above two coagulative surface active agents together. The samples of the solid from Nos. 1ᵇ, 2ᵇ, 3ᵇ and 4ᵇ were collected for the analysis of the grain size distribution, when no agent was used. When the agents were added together, no mud and sand reached the location No. 4ᵇ. The improvement of the grain size distribution due to adding of two agents together is clearly shown in FIG. 3b. It can, therefore, be concluded that the above method was also very effective for forming a uniform earth deposit.

Example III

This example was performed at the same location as Example II. An amount in 60 p.p.m. (parts in weight per million) of polyvinyl-pyridinium-ethylbromide (0.4 g./100 cc. ethylalcohol, reduced viscosity of which is 1.0 at 25° C.) was added into the slurry in the delivery as a coagulative agent in the present example.

Figure 3A:
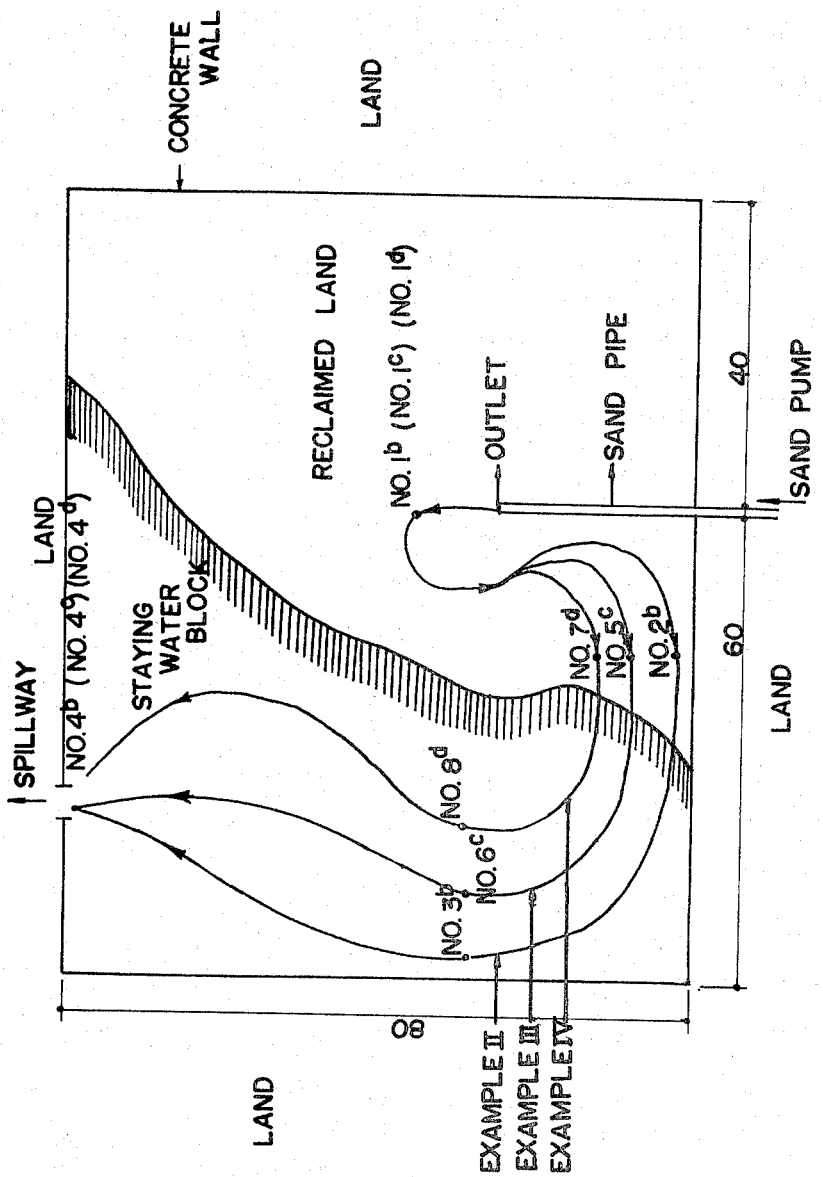
Figure 3B:
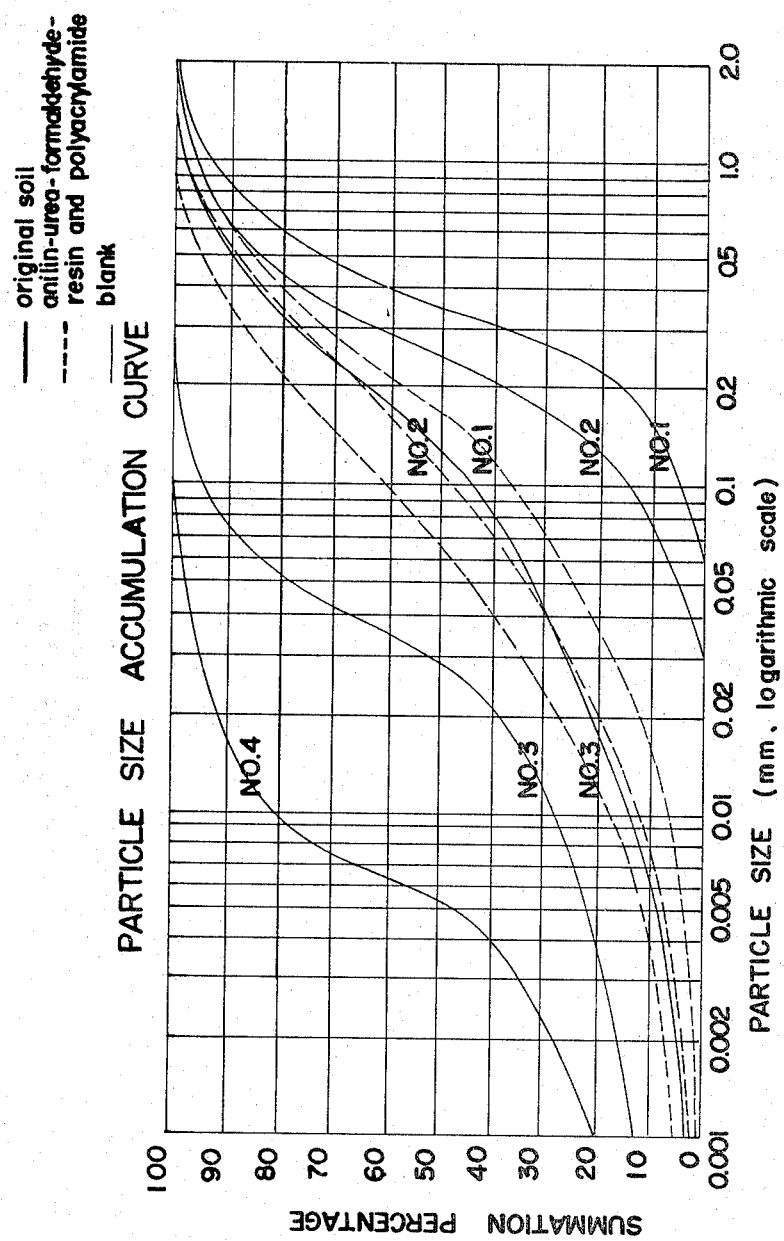

In this case, the stream of slurry coming out of the sand pipe was directed to the spillway No. 4ᶜ through No. 1ᶜ–No. 5ᶜ–No. 6ᶜ (FIG. 3a). The precipitated soil at the locations Nos. 1ᶜ, 5ᶜ, and 6ᶜ was analyzed for the grain size distribution. Only a small amount of soil was precipitated at the location No. 4ᵈ.

The result of the grain size distribution analysis shown by the diagrams in FIG. 5b is somewhat different from that formed in the Examples II and III: It should be noted that a very small amount of silty clay escaped from the spillway. However, the quality of the soil was considerably improved in its uniformity compared with the case without the coagulative agent.

Example IV

The ground C consists of two blocks $a$ and $b$, as shown in FIG. 6a. Since no coagulative agent was used for reclaiming the block $a$, some portion of the soil overflowed into the block $b$ through the spillway, at the location 1ᵉ and precipitated there.

After completion of the reclamation of the block $a$, a grain size distribution analysis was performed by collecting soil from the locations Nos. 1ᶠ to 5ᶠ.

One year after the block $a$ had been completed, reclamation of the block $b$ was commenced by use of a 1,500 H.P. sand pump adding 20 p.p.m. (parts in weight per million) of polyacrylamide (intrinsic viscosity in 1 normal sodium chloride solution was 10.0 at 30° C.) into the dredged sand as a coagulative surface active agent. In this case, the overflow of the soil through the spillway at the location 1ᵉ was not observed. After completion of the reclamation, a grain size distribution analysis of the soil in the block $b$ was performed collecting samples at the locations Nos. 6ᵍ, 7ᵍ and 8ᵍ.

It is quite clear from the result of the analysis of the grain size distribution, as shown in the diagrams of FIG. 6b, that the addition of polyacrylamide into the soil was very effective to obtain uniform reclaimed ground.

Example V

Figure 7A:
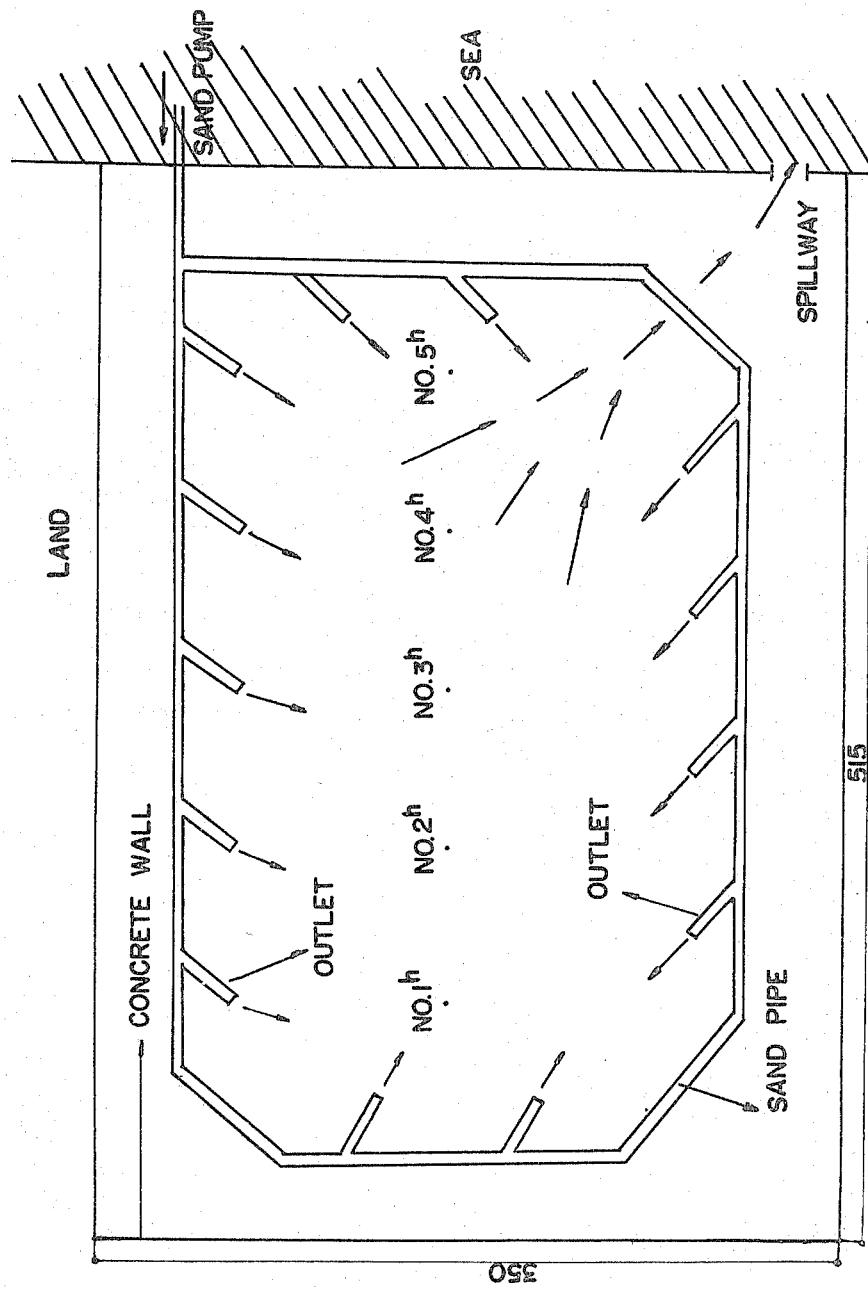

Topography of the ground D is shown in FIG. 7a.

An amount in 30 p.p.m. (parts in weight per million) of polyacrylamide-sulfomethylol compound (the intrinsic viscosity of 1 normal sodium chloride aqueous solution at 30° C. was 10.1) was added to the dredged soil as a coagulative surface active agent.

Figure 7B:
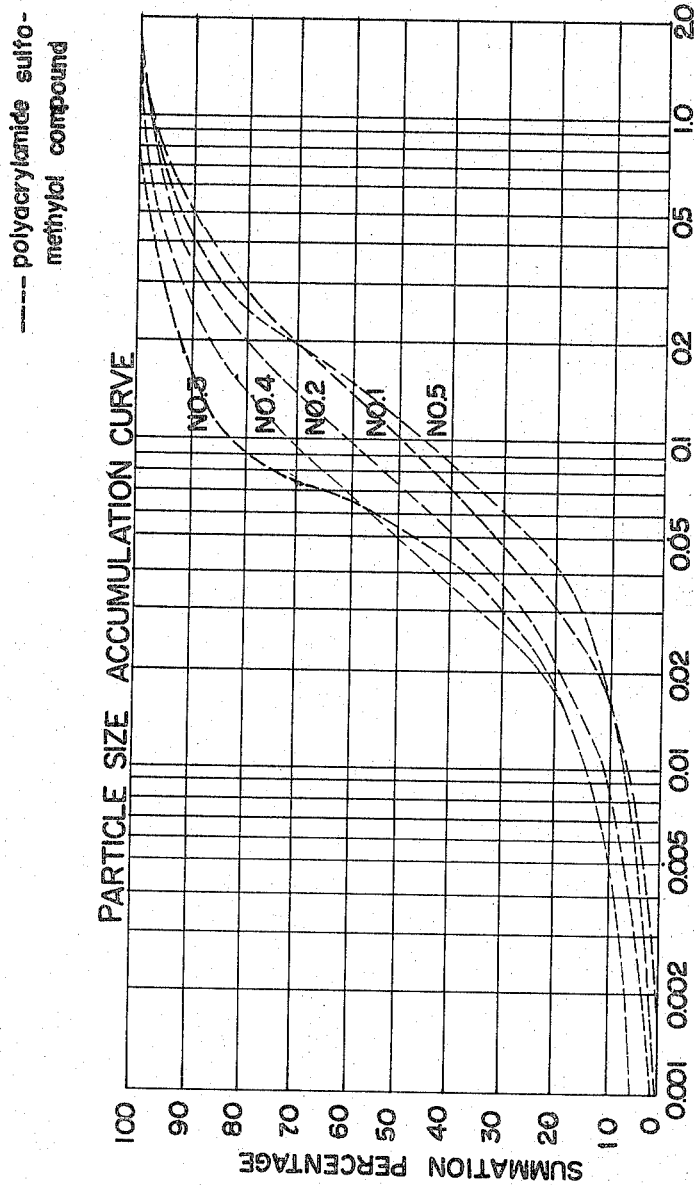

After the completion of the reclamation, the grain size distribution analysis of the dredged soil at the locations 1ʰ to 5ʰ was performed showing that the reclaimed ground was substantially uniform, as indicated in the diagram shown in FIG. 7b.

Example VI

Figure 8A:
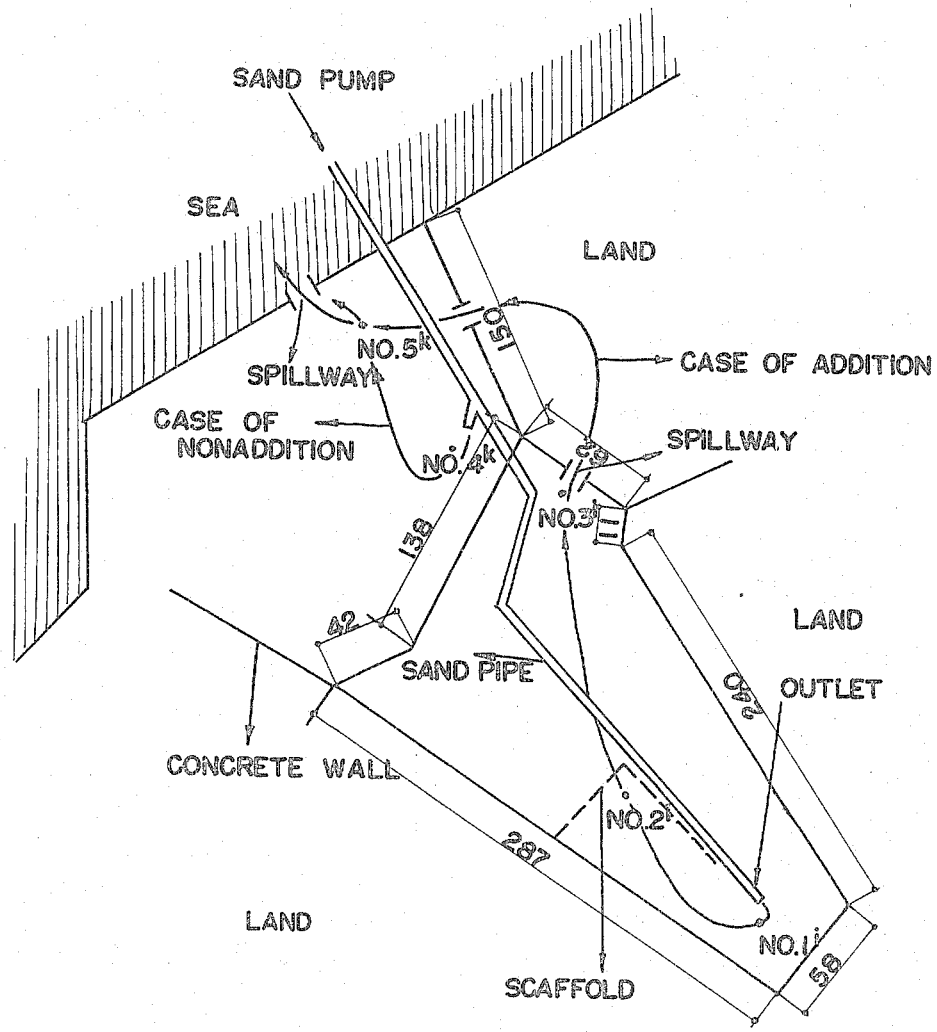

This experiment was performed at the location E if an area of 3,500 m.² with a volume of 11,200 m.³ (FIG. 8a) by adding an amount of 172 p.p.m. (parts per weight in a million) of polyvinyl alcohol (polymerization grade: 18,000–20,000) into the slurry in the delivery as a coagulative surface active agent. The capacity of the dredger (3,000 H.P.) was on the average 698 m.³ per one hour.

In the reclaiming operation, flocs were well formed and the water near the surface became transparent. The floc formation was visible from a scaffolding board at the location No. $2^l$. The water was also transparent at the spillway and hence, it can be said that any suspensions were no longer present.

In order to show that the use of polyvinyl alcohol as a coagulative surface active agent was effective, the grain size distributions of the sample soil taken from the location $1^i$ near the outlet of the delivery pipe and the location $3^i$ near the spillway were compared with those from the location $4^k$ and $5^k$, where polyvinyl alcohol was not used.

FIG. 8b shows by the diagrams developed that the grain size distribution with the coagulative surface agent is quite uniform, whereas this is not the case without addition of the agent.

*Example VII*

A polymer of carboxymethylcellulose with acrylamide was used as the coagulative agent in various amounts, i.e. 0.00625%, 0.00125%, 0.0025%, and 0.005%. The preferred point of addition was to the delivery pipe at a distance of about 30 meters from the outlet. In all cases reclaimed land fill having superior properties was obtained. Similar superior reclaimed land was obtained using as the coagulative agent, an effective amount of a copolymer of vinyl acetate with maleic acid, and also when using an effective amount of a copolymer of styrene with maleic acid.

The reclaimed ground produced by the process of this invention is of a uniform aggregated structure and has superior characteristics. These include excellent permeability which permits rapid run-off of water, uniform and high load bearing characteristics which is evidence of effective consolidation and compressibility properties. The reclaimed land tested has exhibited these properties over long periods of time evidencing good stability. The process is advantageous in that there is little or no waste of fine particles with the overflow. It is also advantageous in that the fill settles uniformly and rapidly with quick drainage of the water permitting the land-fill operations to be carried out expeditiously.

While we have disclosed several embodiments of the present invention, it is to be understood that these embodiments are given by example only and not in a limiting sense, the scope of the present invention being determined by the objects and the claims.

What is claimed is:
1. A method of depositing earth fill comprising
   (i) passing a fluid mixture of solid earth particles comprising a variety of types and sizes including fines within a range of less than 5 microns to 50 microns and sand and larger particles in water through a pipe,
   (ii) adding a small effective amount of a coagulative surface active agent to the pipe carrying said water solids mixture at a point from between about 20 meters and 200 meters from the discharge outlet of said pipe, said coagulative agent being a surface active agent which when admixed with the water-solids mixture will cause the fines and the solids to deposit after discharge at least four times faster than they would deposit in the absence of said agent, and
   (iii) discharging said water-solid mixture on a reclamation site whereby the water runs off leaving the solids in the form of an earth-fill deposit having substantially uniform load bearing characteristics.

2. The process of claim 1 wherein said coagulative surface active agent is selected from the group consisting of polyacrylamide; the reaction product of polyacrylamidesulfomethylol; the polymeric reaction product of carboxymethylcellulose and acrylamide; the water soluble resin formed by condensation of aniline, urea and formaldehyde; polyvinylpyridinium ethylbromide; polyvinyl pyrrolidone; polyethyleneimine; polyvinyl aclohol; polyvinyl acetate; polyethylene glycol; methylcellulose, hydroxyethylcellulose; copolymers of vinyl acetate with maleic acid; and copolymers of styrene with maleic acid.

3. The process of claim 2 wherein said coagulative agent is introduced into said pipe at a distance between 20 meters and 50 meters from the discharge outlet.

4. The process of claim 3 wherein said coagulative agent is a reaction product of polyacrylamidesulfomethylol.

5. The process of claim 3 wherein said coagulative agent is a water soluble resin formed by the condensation of aniline, urea, and formaldehyde.

6. The process of claim 3 wherein said coagulative agent is polyacrylamide.

7. The process of claim 3 wherein said coagulative agent is polyvinylpyridinium ethylbromide.

8. The process of claim 3 wherein said coagulative agent is polyethylene glycol.

9. The process of claim 3 wherein said coagulative agent is polyvinyl alcohol.

10. The process of claim 3 wherein said coagulative agent is polyvinyl acetate.

11. The process of claim 3 wherein said coagulative agent is the polymeric reaction product of carboxymethylcellulose and acrylamide.

12. The process of claim 3 wherein said coagulative agent is the copolymer of vinyl acetate with maleic acid.

13. The process of claim 3 wherein said coagulative agent is the copolymer of styrene with maleic acid.

References Cited by the Examiner

UNITED STATES PATENTS

| 2,745,744 | 5/1956 | Weidner. | |
| 3,118,832 | 1/1964 | Katzer et al. | 210—54 |
| 3,130,167 | 4/1964 | Green | 210—54 |

FOREIGN PATENTS 715,369    1954    Great Britain.

CHARLES E. O'CONNELL, *Primary Examiner.*

JACOB SHAPIRO, *Examiner.*